US012646487B2

(12) United States Patent
Fawcett

(10) Patent No.: US 12,646,487 B2
(45) Date of Patent: Jun. 2, 2026

(54) NORMALIZED BRIGHTNESS CONTROL FOR USER PERCEPTION OF VISUAL MEDIA

(71) Applicant: Snap Inc., Santa Monica, CA (US)

(72) Inventor: Rudd Fawcett, New York, NY (US)

(73) Assignee: Snap Inc., Santa Monica, CA (US)

( * ) Notice: Subject to any disclaimer, the term of this patent is extended or adjusted under 35 U.S.C. 154(b) by 24 days.

(21) Appl. No.: 18/594,552

(22) Filed: Mar. 4, 2024

(65) Prior Publication Data

US 2024/0249700 A1 Jul. 25, 2024

Related U.S. Application Data

(63) Continuation-in-part of application No. 18/157,403, filed on Jan. 20, 2023, now Pat. No. 11,922,901, and (Continued)

(51) Int. Cl.
*G09G 5/377* (2006.01)
*G09G 5/10* (2006.01)

(52) U.S. Cl.
CPC .............. *G09G 5/10* (2013.01); *G09G 5/377* (2013.01); *G09G 2320/0626* (2013.01); *G09G 2320/0666* (2013.01); *G09G 2360/144* (2013.01)

(58) Field of Classification Search
CPC .. G09G 5/10; G09G 5/377; G09G 2320/0626; G09G 2320/0666; G09G 2360/144
See application file for complete search history.

(56) References Cited

U.S. PATENT DOCUMENTS 11,562,153 B1 1/2023 Etwaru et al.
11,756,493 B2 9/2023 Lee et al.
(Continued)

FOREIGN PATENT DOCUMENTS

CN 120569775 A 8/2025
WO WO-2023287465 A1 1/2023
WO WO-2024155929 A1 7/2024

OTHER PUBLICATIONS

"U.S. Appl. No. 18/157,403, Notice of Allowance mailed Nov. 1, 2023", 9 pgs.
(Continued)

*Primary Examiner* — Antonio A Caschera
(74) *Attorney, Agent, or Firm* — Schwegman Lundberg & Woessner, P.A.

(57) ABSTRACT

System and method including receiving visual content for display on a display device, the visual content comprising a plurality of layers comprising a background layer and visual media layer, the plurality of layers being arranged in a presentation stack of layers, evaluating the visual content to determine at least one display parameter, determining a desired brightness level for displaying the visual content on a display of the display device based on the at least one display parameter, determining adjustment of display parameters of the presentation stack of layers to achieve the desired brightness level for displaying the visual content, based on adjusting the display parameters of the presentation stack of layers, generating adjusted visual content, and causing presentation of the adjusted visual content on the display device.

20 Claims, 9 Drawing Sheets

Related U.S. Application Data a continuation-in-part of application No. PCT/US2024/012232, filed on Jan. 19, 2024.

(56) References Cited

U.S. PATENT DOCUMENTS

| | | | |
|---|---|---|---|
| 11,922,901 | B1 | 3/2024 | Fawcett |
| 2015/0089551 | A1 | 3/2015 | Bruhn et al. |
| 2017/0110093 | A1* | 4/2017 | Stein .................... H04N 19/136 |
| 2017/0301288 | A1 | 10/2017 | Perdices-gonzalez et al. |
| 2017/0309215 | A1 | 10/2017 | Perdices-gonzalez et al. |
| 2018/0102107 | A1 | 4/2018 | Xiong |
| 2020/0135074 | A1 | 4/2020 | Wooster et al. |
| 2020/0357142 | A1* | 11/2020 | Aydin .................... G06N 20/00 |
| 2022/0157265 | A1 | 5/2022 | Lee et al. |
| 2023/0023386 | A1* | 1/2023 | Etwaru ................. G06F 3/0304 |

OTHER PUBLICATIONS

"International Application Serial No. PCT/US2024/012232, International Preliminary Report on Patentability mailed Jul. 31, 2025", 9 pgs.

"International Application Serial No. PCT/US2024/012232, International Search Report mailed May 10, 2024", 5 pgs.

"International Application Serial No. PCT/US2024/012232, Written Opinion mailed May 10, 2024", 7 pgs.

* cited by examiner

NORMALIZED BRIGHTNESS CONTROL FOR USER PERCEPTION OF VISUAL MEDIA

CROSS-REFERENCE TO RELATED APPLICATIONS

This patent application is a continuation-in-part of U.S. patent application Ser. No. 18/157,403, filed on Jan. 20, 2023, and is a continuation of International Application Serial Number PCT/US2024/012232, filed on Jan. 19, 2024, each of which is hereby incorporated by reference in its entirety.

TECHNICAL FIELD

The present disclosure relates generally to facilitating display of visual content on a display device.

BACKGROUND

Mobile devices are a critical part of daily communication, entertainment and work, where video, visual images and written materials are presented on a display screen. Users employ such devices in a variety of conditions, characterized by changes in lighting or position. Additionally, users can view or interact with multiple content items during a user session, the content items exhibiting a variety of image-level characteristics, or media stream-level transitions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
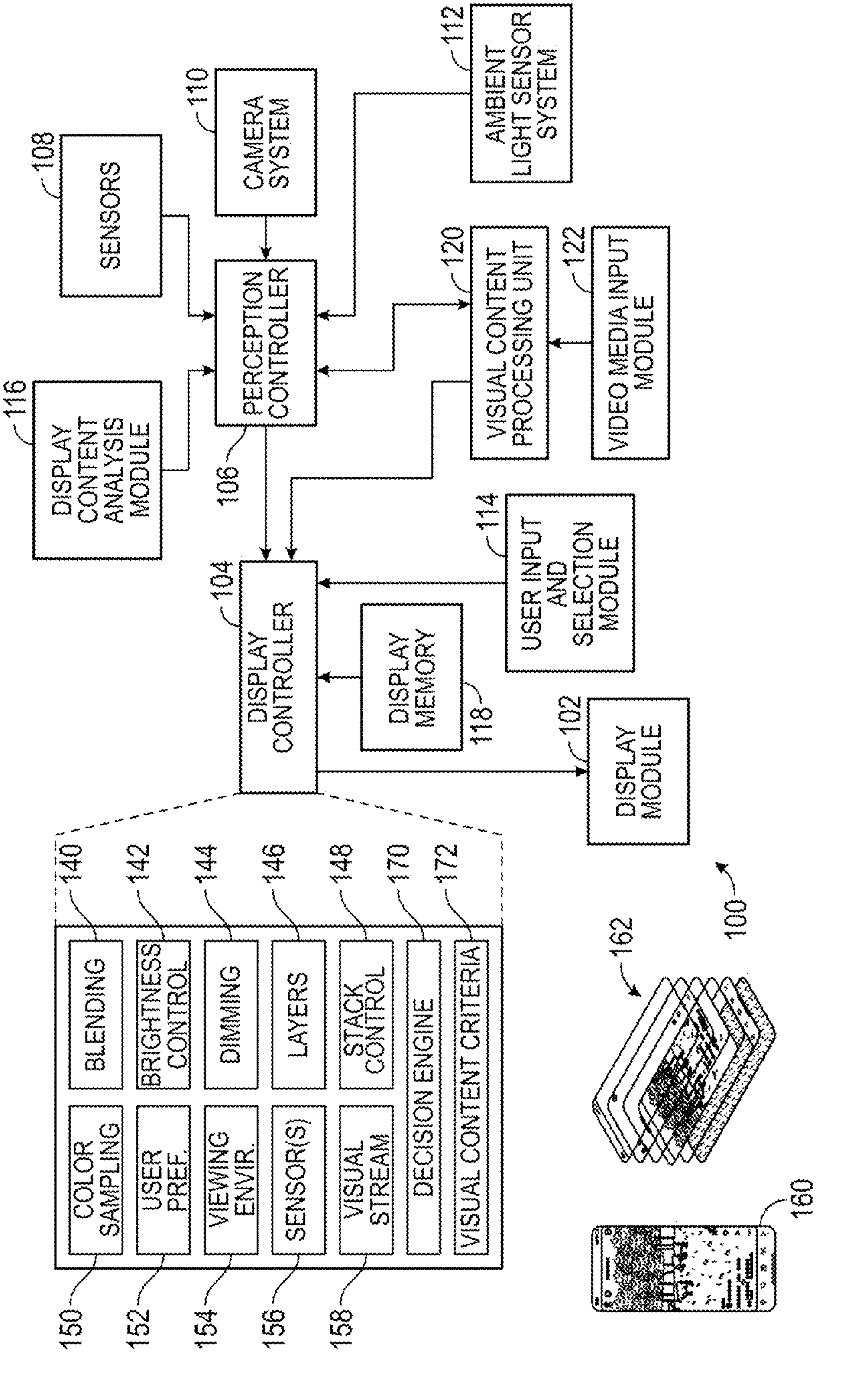
FIG. 1 is a diagrammatic representation of a device display system, according to some examples.

Mobile devices are a critical part of daily communication, entertainment and work, where video, visual images and written materials are presented on a display screen. Common display technologies adjust or control the brightness of the display screen uniformly for all applications or uses. For example, traditional display devices (e.g., mobile devices, smart phones, and so forth) are configured to adjust the brightness level of their display based on the environmental lighting conditions or user preferences. Screens can be designed for display in a variety of conditions, potentially automatically set or controlled by a user: the user may choose to reduce the brightness to save energy or for a more comfortable viewing experience, or may increase the brightness for additional visibility. Existing mobile devices include an ambient light sensor and/or camera to determine the environmental lighting or other environmental information. The environmental information is used to adjust the brightness level of the display (e.g., screen) for operation within the current context or location. For example, an ambient light sensor can provide an ambient score used to determine a mode of display, such as decreased brightness, dark mode, true tone, night shift and others. Such adjustments consider the environmental light in which the device operates and seeks to change the mode of display as a function of the ambient score. Separately, these adjustments can be time-based according to a local sunset or sunrise and switch to adjust the monitor or screen. Such adjustments are made to the display of the device to adjust the brightness level of the entire display uniformly. This can be done by increasing or decreasing the strength of the backlighting of the display of the display device or by other means in non-backlit displays.

However, the viewing experience can be characterized by a wide variety of situations and/or conditions. The user can change location, influencing the brightness setting. The user can be relatively stationary, but watch different videos or scroll through a variety of visual content, as part of a stream of video content (e.g., when using apps on a mobile phone to view short clips of video in succession). A first video can have a low brightness level, while a successive video has a higher brightness level. Videos, and/or other content, can alternatively or additionally differ in color or hue. Furthermore, the brightness, color or hue of visual content items can change dramatically from one frame to the next. Many current applications or services allow users to view visual content (e.g., videos, photos) created by other users, where content creation is done in varying lighting environments with varying types of equipment (e.g., cameras, flash lighting). For example, a video captured at night may be darker than a video captured during the day.

Conventional display control applies brightness control to the device and changes the display of the visual content with a generalized brightness adjustment. Such universal control may be effective when the visual content presented on the display is generated in a consistent manner such that the brightness level of each of the visual content items is relatively similar, but can otherwise result in an inconsistent and diminished viewing experience. For example, each visual content item will be presented at a consistent brightness level (e.g., increased or decreased brightness level) for all viewing conditions, such as the environmental lighting conditions in which the user is viewing content on the display device. This solution may create an environment-specific user perception of content, but it does not alter the brightness level of the individual visual content items. For example, some visual content may appear brighter or darker than other visual content.

Example embodiments in the disclosure herein address technical problems related to providing a consistent, high quality viewing experience as users scroll through, or otherwise view, different content items on a display device, where the content items have been created in varying lighting environments and/or have varying brightness levels. Such technical problems are addressed by a device display system and method that control the perceived brightness level of individual content items to provide a consistent viewing experience. The system adjusts the perceived brightness of visual content based on analyzing the visual content, rather than just environmental information. In some examples, the system implements a method for digitally controlling a perception created by the display device by providing automated, dynamic and relational control of the displayed content based on a set of viewing criteria. Such automated control provides an enhanced viewer experience in the context of various apps and services that enable media creation and/or consumption.

In some examples, the device display system analyzes received or retrieved visual content, determines an initial brightness level for the visual content, and determines a desired brightness level for the visual content prior to displaying it. The display device can use multiple presentation layers, arranged in a stack, to present the visual content (images, videos, and/or other media). The device display system uses relationships among layers and/or adjustments to layers to achieve a desired user perception, such as the desired perceived brightness level, by digitally controlling and/or adjusting the multiple presentation layers of visual content.

Adjusting the perceived display of individual visual content items on the display device is based on evaluating or analyzing aspects of the visual content. The evaluation results are used to adjust display parameters of one or more presentation layers. Example aspects include the brightness, opacity and/or coloring of an image, the contrast of images in sequential video streams, or other features. Various adjustable or controllable parameters include the opacity, color, and/or shade of a given layer or layers, the number of layers, or other parameters. In some examples, the system incorporates a process of layer stacking that modifies the presentation layer stack by adding, removing and/or reordering layers to provide enhanced perception of the content displayed. In some examples, the layer stack is modified by applying an additional layer parameter to at least one of the layers of the visual content. In some examples, the layer stacking modification adjusts one or more of the current parameters of at least one presentation layer. Adjusting the perceived display can also use information about the environment in which the visual content is being viewed. In some examples, the system can also incorporate conventional overall brightness adjustments, using for example general brightness settings of the display device.

In some examples, the system evaluates an initial brightness and/or other characteristics of the visual content. A perceived brightness or brightness level can start as the evaluated initial brightness, and/or be modified to achieve a desired brightness level. The system modifies the perceived brightness of visual content by adjusting an opacity of a visual media layer, adding and/or adjusting the color, brightness, or shade of a background layer of the visual content, applying or adjusting a filtered layer over the visual media layer, and/or a combination of thereof. The system can decrease the perceived brightness of visual content by decreasing the opacity of the visual media layer, thereby increasing the visibility of a dark colored background layer through the visual media layer. As another example, the system can increase the perceived brightness of visual content by increasing the opacity of the visual media layer, thereby decreasing the visibility of a dark colored background layer through the visual media layer.

In some examples, multiple interfaces or types of visual media are being viewed in sequence or in close temporal or spatial proximity. In such examples, an analysis of the previous visual content (or interface) presented to the user can be conducted. For example, the brightness level of previous visual content can be used to determine the desired brightness level of subsequently presented visual content.

In some examples, the system uses a graduated level of control to facilitate a smooth transition for the user's perception of the visual content, including for example adjusting the perceived brightness level immediately or after a given period of time. Adjusting the perceived brightness level of each item of visual content provides a consistent user experience, as the perceived brightness level of each item of visual content is normalized, regardless of the brightness level of the original visual content.

By using one or more strategies such as parameter adjustment and/or addition, layer stacking and/or re-ordering and others, the device display system achieves a perceived brightness adjustment and/or perceived brightness level corresponding to a desired user perception of the visual content.

FIG. 1 is a diagrammatic representation of a device display system 100 for displaying visual content on a display device, the system configured to adjust the perceived brightness of the visual content, according to some examples. The device display system 100 presents visual content to a user, for example via a display module 102.

In some examples, image 160 exemplifies an image presented on a smart phone, or another display device. The image 160 is created by using multiple layers as illustrated in presentation layer stack 162. In a digitally controlled system, such as a photo editing system, the layers are abstractions, and represent relational series of pixelated flat layers. The layers are pixel-based and can be edited or modified by digital processors. Example layers include an image layer (containing an image for display) and/or a background layer. The layers of presentation layer stack 162 are defined having a hierarchy with respect to each other: for example, an image layer can be positioned among multiple other layers. Visual media is presented on an image layer referred to herein as a visual media layer. Visual media can include images, video frames, and so forth. In some examples, the layers are, by default, akin to transparent layers of paper, each placed on top of each other to form a layer stack. When a layer presents the visual media or content, that layer is a visual media layer. Layers above and below the visual media layer are designed to present the image for user presentation and/or user interaction with the device. A background layer (or backing layer) is a layer that can be provided below the visual media layer in the stack. In some examples, the background layer can be colored in a variety of ways, using for example solid colors, non-uniform coloration, or other color configurations. In some examples, the background layer is a solid color background layer with a default color of black. Similarly, the opacity values and/or brightness values for the background layer can vary throughout the background layer, or can remain the same throughout the background layer. The color information, brightness (or brightness level) and/or opacity information for the background layer can be determined based on sampling of the visual media content (e.g., in the visual media layer), such as for example color sampling, sampling opacity values, and so forth.

In some examples, the digital layers default to a transparent state and/or are adjusted by a designer. In some examples, the device display system 100 digitally controls layers of the presentation layer stack, such as presentation layer stack 162, as a function of specific information including, but not limited to, color sampling of the visual media, the content of the image presented in a visual image layer or visual media layer, a sequence of video images presented, the environment in which the user views the displayed visual content and so forth. The device display system 100 system controls the relationship of the individual layers and hierarchies based on these and other viewing criteria.

The device display system 100 includes a display module 102 for presenting visual content to a user. The visual content displayed via display module 102 is provided as a set of layers, including a background layer, a visual media layer, and/or multiple other layers, which may include filter layers. The display module 102 can be part of a display device, such as a mobile device, television smartphone, tablet, computer monitor, human machine interface (HMI), and the like. For example, the display device can include some or all of the components of the device display system 100 shown in FIG. 1. The display module 102 of the device display system 100 uses backlighting technology, such as a light crystal diode (LCD) display, or other display technologies such as organic light-emitting diode (OLED), to illuminate/present visual content. In some examples, the device display system 100 can incorporate these or other technologies, adjusting the perceived brightness of visual content based on the visual content or stream of visual content displayed, environmental conditions, or other conditions in which the display device is operating. The device display system 100 does not rely on display device brightness control, although it can use such information. The device display system 100 adjusts the perceived brightness of the content prepared for display on the display device.

The display controller 104 controls the visual content for display and is coupled to the display module 102 (e.g., the display controller 104 corresponds to a display content controller). The display module 102 publishes the visual content in response to the display controller 104. The display controller 104 is controlled by a main controller 106 (e.g., a perception controller). The main perception controller 106 acts as central processing unit for operational control of the device display system 100 and interfaces with the device of which the device display system 100 is a part. The perception controller 106 processes data, instructions, commands, and other information within the device display system 100. The controller 106 is coupled to sensors 108, a camera system 110, an ambient light sensor system 112, and a visual content processing unit 120.

The device display system 100 maintains settings in the display controller 104 to control the brightness and/or parameters of display module 102, for example to adjust the screen brightness in response to data received from the ambient light sensor system 112 or the camera system 110. These settings can be provided to the display controller 104 based on user input and/or selection module 114, or can be determined by the device display system 100 (e.g., by the controller 106 and/or the display controller 104).

The display controller 104 controls the background layer, visual media layer, medial layers and/or filter layer(s) to create a presentation of the visual content to a user. The display controller 104 controls the perceived brightness of the displayed content by adjusting the display parameters of the visual content. Display parameters can refer to parameters of a set of layers (e.g., a presentation stack of layers) or to parameters of one or more individual layers. Set-level parameters characterize layer order, layer hierarchy (e.g., layout) of the presentation stack, modifications or adjustments to the layer order or hierarchy, decisions regarding including or applying one or more filter layers, and so forth. Layer-level parameters can refer to opacity, color, and/or shade of the individual layers of the visual content, and so forth.

The display controller 104 receives visual content from visual media input module 122 and/or evaluates the visual content for brightness level and/or other parameters to determine a control strategy for the presentation layers. The visual media input module 122 can receive or access the visual content and/or other information from a local data store (e.g., display memory 118), an external source through an application installed on the device display system 100, from the Internet or other network, from the camera system 132, and so forth.

During the analysis, display controller 104 evaluates parameters of the visual content to determine a current brightness level of the visual content in relation to a desired brightness level of the visual content. For example, the display controller 104 can determine the current brightness level of the visual content by analyzing the pixels of the visual content, such as by determining pixel values or other methods of color calculation. The display controller 104 can determine a value indicating the current brightness level of the visual content. The display controller 104 can compare this value to a threshold value or value range that indicates a desired brightness level for the visual content. A perceived brightness level of the visual content can be initialized as the current brightness level of the visual content. The display controller 104 can determine whether and how to adjust this perceived brightness level based on a comparison of the current brightness level value to a threshold value or value range that indicates the desired brightness level for the visual content to be presented to the user. The threshold value can be a static value or dynamically determined value based on various inputs, such as sensor input indicating the current environmental lighting conditions of the device display system 100, previously presented visual content, the difference in brightness before the current visual content and previously presented visual content (e.g., to facilitate a smooth transition between content items, etc.) and the like. In some examples, if the current brightness value falls below the threshold value, the display controller 104 determines that the perceived brightness level of the visual content should be increased (e.g., from the current brightness level to at least the threshold value). If the value is greater than the threshold value, the display controller 104 determines that the perceived brightness level of the visual content should be decreased (e.g., from the current brightness level to at least the threshold value). If the value falls within a specified range of the threshold value, the display controller 104 determines that the perceived brightness level of the visual content should not be altered.

The display controller 104 can provide data indicating the outcome of the analysis to the visual content processing unit 120. Example output can indicate whether the perceived brightness level of the visual content should be modified, whether the perceived brightness level should be increased or decreased, and/or a degree to which the perceived brightness level should be increased or decreased.

The visual content processing unit 120 receives, for example via display controller 104, the output of the display content analysis module 116 and adjusts the display parameters of the visual content accordingly to achieve the desired brightness level of the visual content. In some examples, the display parameters are adjusted to achieve a pre-specified degree of change to the current brightness level (or a perceived brightness level, as detailed above). Control decisions can be implemented by circuitry or computer readable medium operation in the display content analysis module 116, the visual content processing unit or a combination of both. Each of the display content analysis module 116 and the visual content processing unit 120 can include computer processing units. The control decisions and strategies determine whether to make an adjustment and then implement the adjustment accordingly by instructing brightness control module 142, layer control module 146 and/or stack control module 148 (e.g., a stack hierarchy control module). The brightness control module 142 is adapted for adjusting the opacity, color, and/or shading of one or more layers of the visual content. For example, the brightness control module 142 decreases the opacity of the visual media layer to increase the visibility of darker background layer to reduce the perceived brightness of the visual content. Alternatively, the brightness control module 142 increases the opacity of the visual media layer to decrease the visibility of the background layer to increase the perceived brightness of the visual content. As another example, the brightness control module 142 can darken or lighten a filter layer applied on top of the visual media layer to decrease or increase the perceived brightness of the visual content accordingly. The layer control module 146 controls the application of additional layers to presentation layers for display of the visual content. The stack control module 148 controls change in the composition of the stacking layers and/or adjusts the stacking order of the presentation layers (e.g., the stacking hierarchy of the presentation layers).

The display controller 104 is coupled to, or can incorporate, display memory 118. The display memory 118 stores information of prior visual media, such as parameter settings, control decisions and/or strategies, and so forth. This information may also be used to determine a current display control of the current visual content, such as a look-up table of conditions to controls. The adjusted presentation layers for display of the visual content are provided to display module 102, which causes display of the visual content to the user. In some examples, a user can select different options for presentation of visual content, where the options are provided to the display controller 104 as preferences for specific type of adjustments. This option allows the user to select which adjustments and controls of the presentation layer are preferred.

In some examples, the brightness control module 142 can adjust the visual media layer's opacity and/or insert or modify the color, shade (or brightness) of a background layer to reduce the perceived brightness of the visual content. In some examples, the brightness control module 142 can add a filtering layer on top of the visual media layer that provides more granular control over the perception of color and/or contrast of the visual content displayed to the user. The display controller 104 communicates with controller 106 to control the various layers published or presented on the display module 102.

The device display system 100 has a main controller or processor in communication with perception controller 106 coupled to the display controller 104 to provide information from the various sensors, including sensors 108, camera system 110, or ambient light sensor system 112. In some examples, the device display system 100 uses the ambient light sensor data to make a general brightness adjustment to the display module 102 and/or the visual content processing unit 120 to make a content-specific brightness adjustment using the presentation layers. In some examples, the display controller 104 uses the ambient light sensor data and/or the visual content analysis to make decisions to change the perceived brightness level of visual content presented on display module 102. In some examples, the display controller 104 uses the camera to provide a general brightness adjustment to the display module 102. In some examples, the user of the display device can override the display controller 104 decision(s) and implement a specific control or strategy for adjusting brightness. In addition to brightness control, the display controller 104 can also implement control of a portion of a full screen image, such as for picture-in-picture, where a first adjustment for the visual content of a first portion of the display screen is different than a second adjustment applied to a second portion, or window, of the display screen. In some examples, the system provides an overlay color for the visual content and/or control color filters positioned over the visual media layer or other presentation layers.

The display controller 104 includes modules for control of various layers in the presentation layer stack, as illustrated by the image 160 comprised of multiple layers in presentation layer stack 162. The display controller 104 includes multiple modules or units for controlling aspects of the display, including a decision engine 170 to determine and implement the controls as a function of the visual content and the viewing criteria. The decision engine 170 determines how images are rendered on display module 102 (e.g., on as a display screen). Decision engine 170 receives information from the color sampling module 150, user preferences unit 152, viewing environment unit 154, sensor(s) 156, visual stream module 158, or visual content criteria module 172. For example, the visual content criteria module 172 provides information on the use of the various inputs to the decision engine 170 and/or the priority of each input. Once the decision engine 170 determines the desired perception and the controls to achieve it, the decision engine 170 controls the various modules such as blending module 140, brightness control module 142, dimming control 144, layer control module 146, and/or stack control module 148. In some examples, the system can implement alternative content-based controls to achieve a variety of user perceptions. In some examples, the system can store a mapping of visual content and visual stream data for specific adjustments of the opacity of the background layer or the use of filters.

In some examples, the color sampling module 150 samples the color of the visual media to identify a major color or colors, the information being provided to decision engine 170 to help determine a color or colors of a background layer of a presentation layer stack. In some examples, user preferences unit 152 provides decision engine 170 with preference information received from the user or determined by the system 100 based on the prior user control of the display. Viewing environment unit 154 determines a lighting condition or other condition in which the user is viewing the visual media. For example, the module can determine that the user is viewing the visual media during day, at night, inside or outside, that the user is viewing the visual media in a moving vehicle (e.g., car, train, etc.), or other conditions. Such information is provided to decision engine 170, which uses it to determine background layer color, filter selection, dimming control, and so forth.

Decision engine 170 also receives information from sensor (s) on a device housing the display device or module 102, such as information concerning ambient light conditions, or other environmental conditions. Additionally, a visual stream module 158 provides information on brightness, color, or other differences from one frame to the next, which is useful in modern mobile apps as short videos are viewed in succession and/or have individual characteristics different from other videos.

In some examples, the display controller 104 includes a visual content criteria module 172 provided to the decision engine 170, the module guiding the operation and decisions of decision engine 170. The visual content criteria module 172 can have predetermined settings or controls for content satisfying various criteria. When such criteria are detected, the visual content criteria module 172 provides the one or more predetermined controls to decision engine 170. These predetermined controls can be stored in a look-up table, or other memory storage device.

The decision engine 170 controls various modules, as described below. The blending module 140 applies blending techniques to multiple layers to achieve a desired perception condition. The brightness control module 142 can be applied to any of the layers and/or used to adjust the background layer. It can operate to dim or brighten any of the layers, including the visual media layer. The layer control module 146 can add and/or control filtering layers, overlay layers, or other layers. The stack control module 148 determines a stack hierarchy that defines the relation of the layers to each other in a presentation layer stack.

Overall, the display controller 104 and/or the decision engine 170 control the presentation layer stack 162 to improve user perception and/or user experience. The analysis and control of the parameters of the presentation layers enables a smooth experience for a user viewing changing visual content, for example by scrolling or swiping, flipping through screens and so forth.

Figure 2:
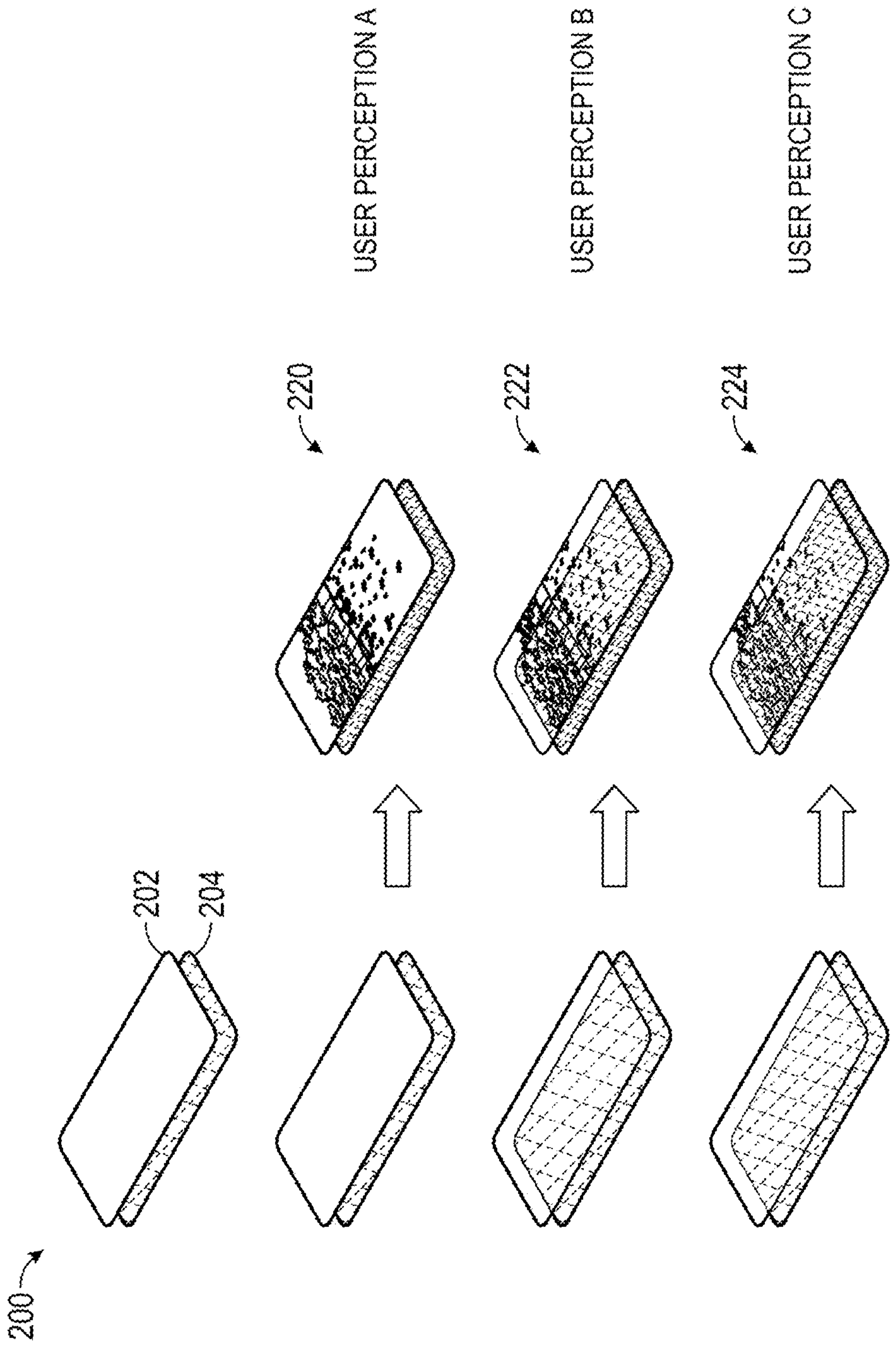
FIG. 2 is an illustration of layers for presentation of content on a mobile device, according to some examples.

FIG. 2 is an illustration of layers for presentation of content on a mobile device, according to some examples. In some examples, the visual content is presented for display as a set of presentation layers, where control of one or more individual layers determines the user perception of the visual content (e.g., overall, and/or at the level of each layer). FIG. 2 illustrates display layer configuration 200 that includes a visual media layer 202 displays the visual content or images over a background layer 204 (e.g., a base layer) of a defined uniform color. In some examples, a color and/or brightness of the background layer 204 is determined and/or dynamically adjusted based on sampling the coloring of the visual content presented at the visual media layer 202.

In some examples, the visual media content can be an outdoor scene with green as a major color component in the image (e.g., see outdoor scene in FIG. 2). In some examples, to improve the user perception, the background layer 204 coloration calculation is influenced by the green color of the visual media, and/or can be determined by the previous frame and/or the next frame of visual content to be displayed.

For a first user perception A, an element 220 corresponding to a display with opaque visual media layer has a default opaque visual media layer 202 over a background layer 204. The visual media layer 202 is not adjusted, but presented as received, without change to brightness, opacity or color. The user perception A corresponds to a clear, crisp image. The color of the background layer 204 can be adjusted based on sampling of the visual media layer 202.

For a second user perception B, an element 222 corresponding to a display with semi-opaque (dimmed) visual media layer of the same visual media content has the identically colored background layer 204, as the background layer color is a function of the same visual media. The visual media layer 202 is adjusted to decrease its opacity to achieve user perception B. The background layer 204 is the same color as in perception A, but the visual media layer 202 adjustment results in user perception B. The adjustment decreases the opacity of the visual media layer 202; additional and/or alternative modifications of visual components can be implemented to achieve the desired user perception.

For a third user perception C, an element 224 corresponding to a display with mostly clear visual media layer (in some examples, dimmed) uses a background layer 204 of the same color as in perceptions A and B (again, the color of the background layer is a function of the same visual media). The visual media layer 202 is adjusted to decrease its opacity to achieve user perception C; additional and/or alternative modifications of visual components can be implemented to achieve the desired user perception.

Comparing user perceptions A, B and C illustrates the change in user perception achieved by adjusting the visual parameters of the visual media layer 202. Perception is controlled by adjusting the display and color inputs to the visual media layer 202. Comparison of user perception A, B and C illustrates the change in user perception achieved by adjusting the visual parameters of the visual media layer 202. The layers of the presentation layer stack are digitally controlled for color and opacity in relation to the image content, the viewing environment, the relation to other frames and the relation of layers to each other. As the layers are digitally controlled to adjust the components of color, brightness, opacity, and other visual components, all of these controls impact the user perception of the display, and therefore are subject to changing characteristics of the visual content.

Figure 3:
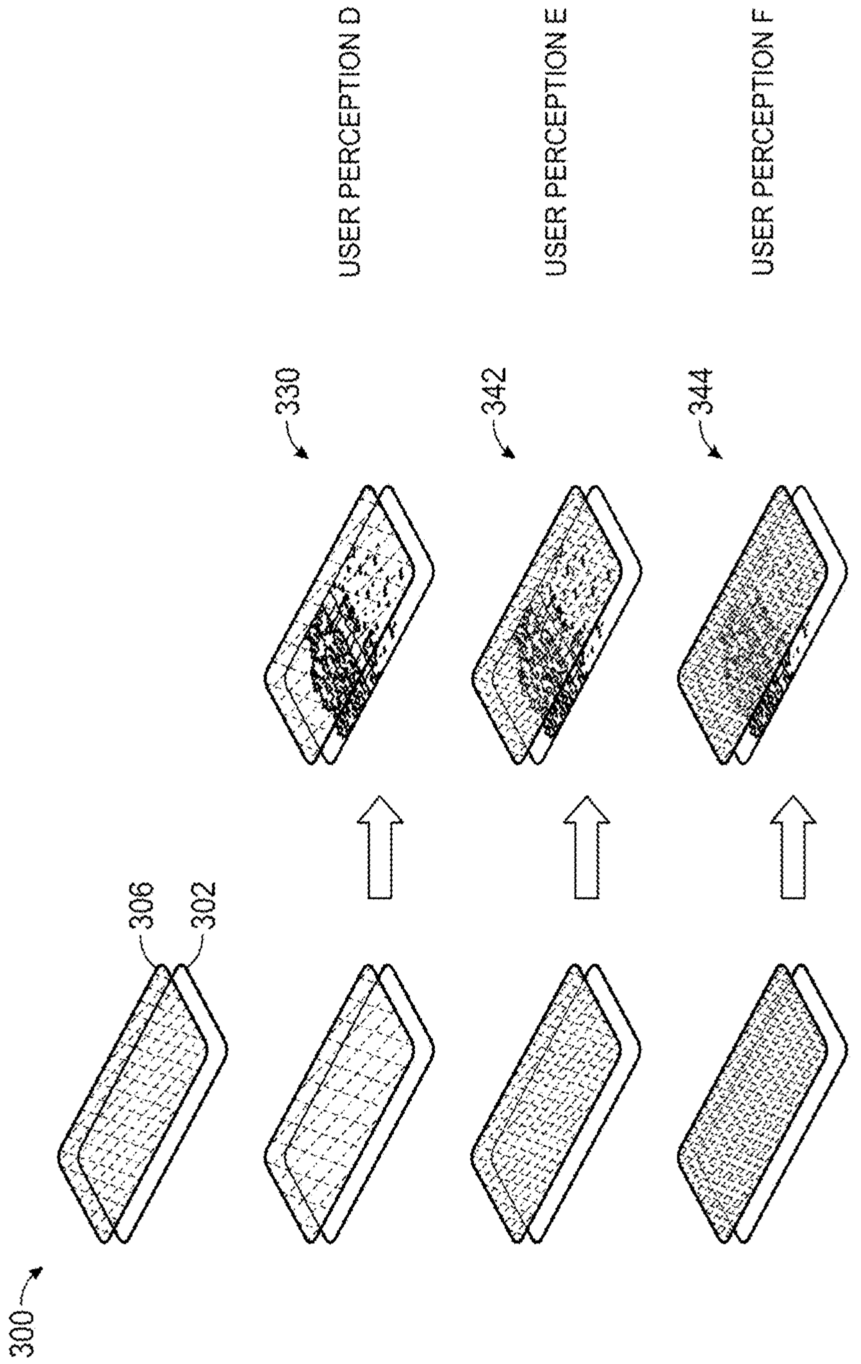
FIG. 3 is an illustration of a configuration including a filter layer applied to a presentation layer stack, according to some examples.

FIG. 3 is an illustration of a configuration 300 including a filter layer applied to a presentation layer stack, according to some examples FIG. 3 illustrates a visual media layer 302 that remains the same, and a filter layer 306 that is adjusted to achieve different user perspectives. In some examples, additional layers can be used, such as a background layer (not shown).

For user perception D, a clear filter layer 306 is added to the visual media layer 302 (see element 330). The resulting image is clear and crisp.

For user perception E, the filter layer 306 is dimmed, and added to the visual media layer 302 (see element 342). User perception E corresponds to a darker view of the visual media.

For user perception F, the filter layer 306 is dimmed further to an almost fully opaque condition (see element 344). The visual component of opacity for the filter layer 306 is adjusted to low transparency. In some examples, the filter layer 306 can be dynamically adjusted in relation to the color sampling of the visual media layer 302.

An advanced filter layer 306 can apply blending of two or more layers to achieve a desired result. A blending mode is used in digital display technology to determine how two or more layers are blended to achieve a resultant display. Blending allows darkening or lightening of an image, or consideration of the different colors (e.g., RGB) for use with a base color, such as that of the background layer. An example blend mode is a dissolve mode that takes random pixels from one or more layers and adds these to a given layer for effect. A color burn mode can invert the background by dividing it by the filter layer color and inverting with the visual media layer. Alternatively, a color burn mode can divide the inverted background layer by the filter layer or the visual media layer, and then invert the result. An overlay mode, applied to the filter layer, makes the visual media appear lighter or darker depending on the coloring applied to the filter layer.

Figure 4:
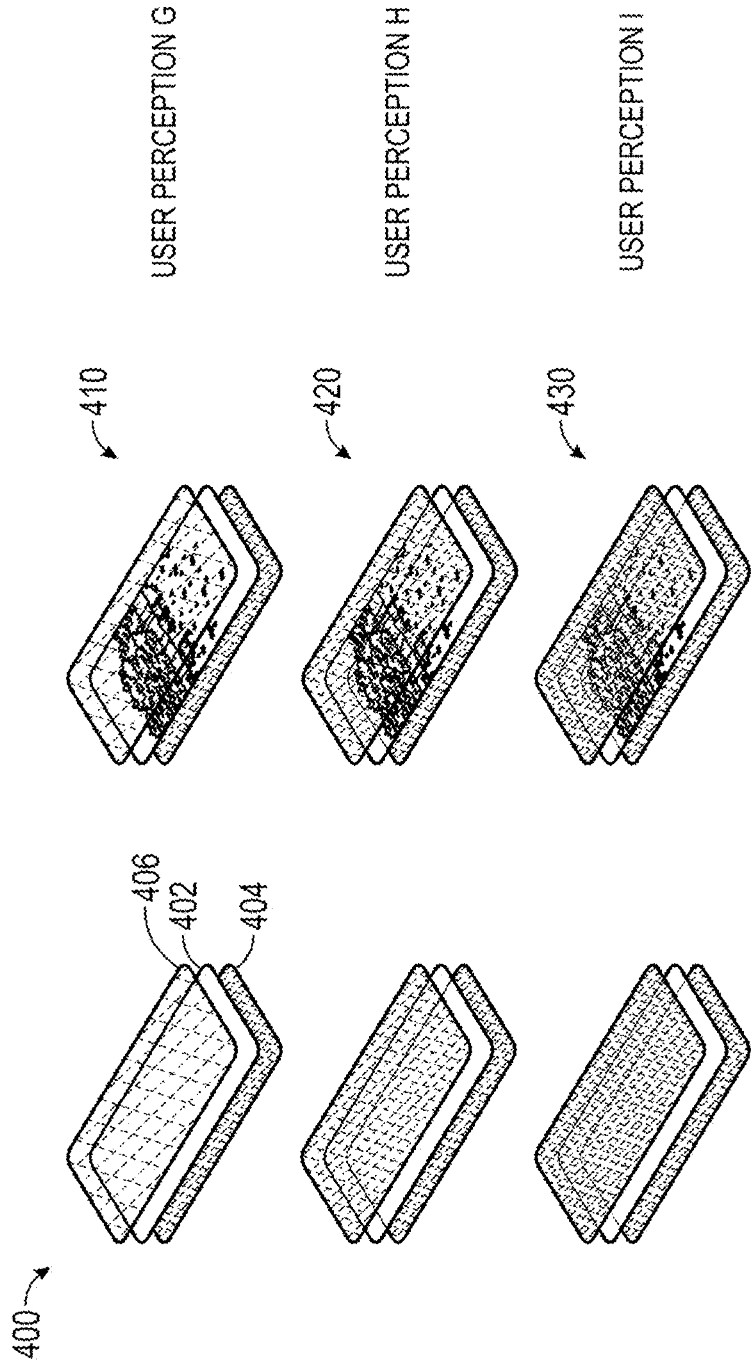
FIG. 4 is an illustration of a configuration including a filter layer applied to a presentation layer stack and background layer, according to some examples.

FIG. 4 is an illustration of a configuration 400 including a filter layer applied to a presentation layer stack and background layer, according to some examples.

The configuration 400 includes a visual media layer 402 sandwiched between a background layer 404 and a filter layer 406. Different user perceptions can be achieved by adjusting the color and/or brightness of background layer 404 (e.g., based on image color and/or brightness of visual media layer 402), and/or applying a filter layer 406, where the color and opacity are controlled such that the visual media appears as desired. In some examples, filter layer 406 is dynamically adjusted in relation to the visual media layer 402 and/or other viewing criteria.

FIG. 4 illustrates example perceptions G, H, and I.

For perception G, display 410 has a first coloring and opacity of the filter layer 406. The background layer 404 can be a default color, such as black, or can be of a color and/or brightness derived from sampling the visual image content of visual media layer 402.

For perception H (illustrated by display 420), filter layer 406 is dimmed, with the same background layer 404. The background layer 404 has color and/or brightness based on the sampling of the visual media layer 402.

For perception I (illustrated by display 430), filter layer 406 is further dimmed to darken the presentation of visual media layer 402 (e.g., an image layer).

Figure 5:
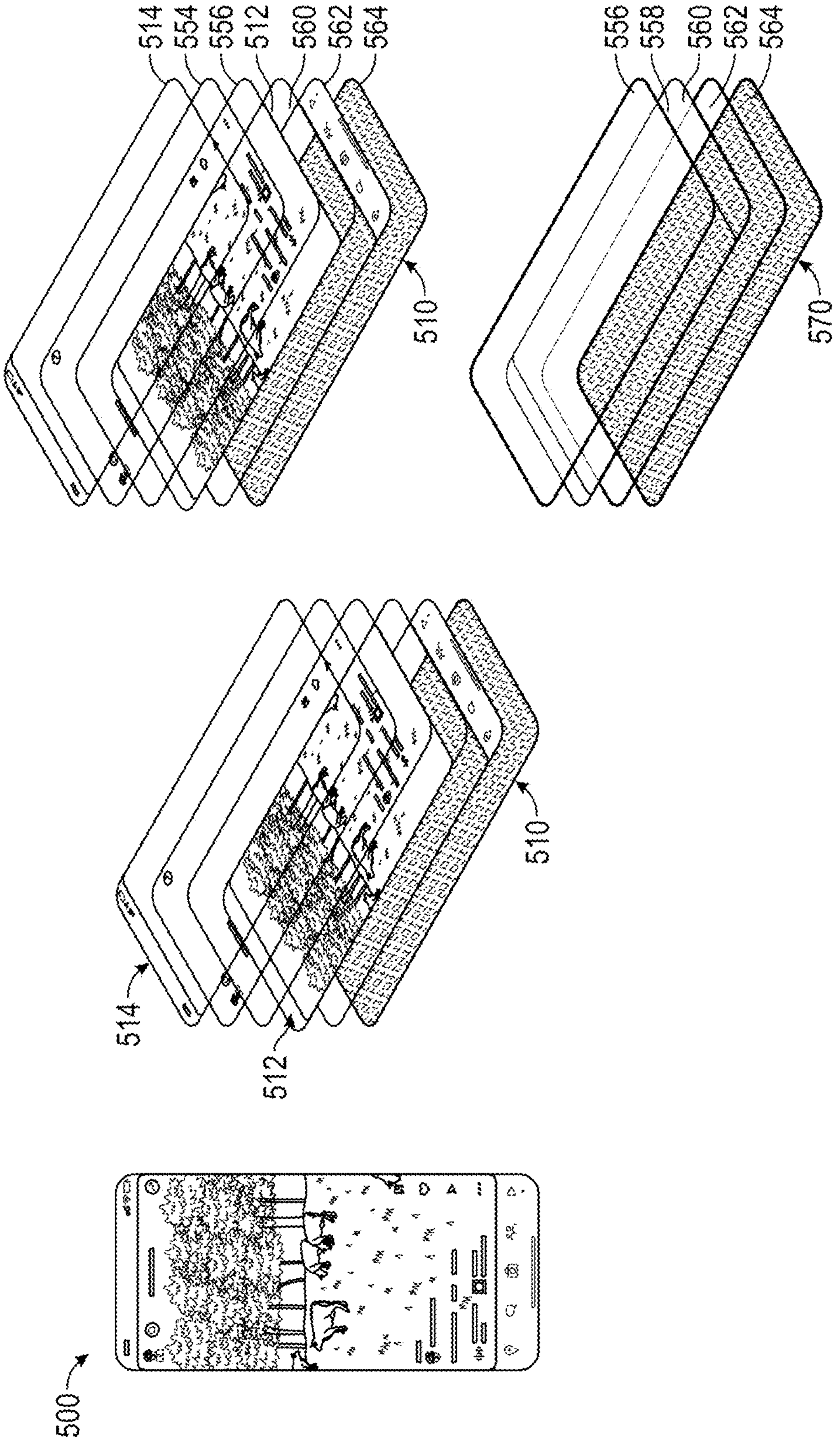
FIG. 5 is an illustration of a multi-layered presentation layer stack applying blend modes to achieve a user perception, according to some examples.

FIG. 5 is an illustration of a multi-layered presentation layer stack 500 applying blend modes to achieve a user perception, according to some examples. FIG. 5 illustrates elements of a multi-layered presentation layer stack 500 including, among others, a status bar 514 (overlay layer), title bar 554, overlay interface 556, visual media elements 512 or 558, visual media container 560, tab bar/home indicator 562, application window 564. As illustrated at least by elements 510 and 570, the layers can be used to construct an overall user perception. For example, visual media element 512 can correspond to the visual content seen towards the middle of the layer, while the visual media container 560 corresponds to the layer-level container (similarly for sub-elements 558 and 560 as part of element 570). Element 562 can correspond to a tab bar/home indicator element (shown in connection to a separate layer), element 554 can correspond to a title bar, element 514 can correspond to an overlay layer (or status bar), and so forth. By using blending modes such as an overlay mode or others, the device display system can configure a desired user perception based on the presentation stack of layers.

Figure 6:
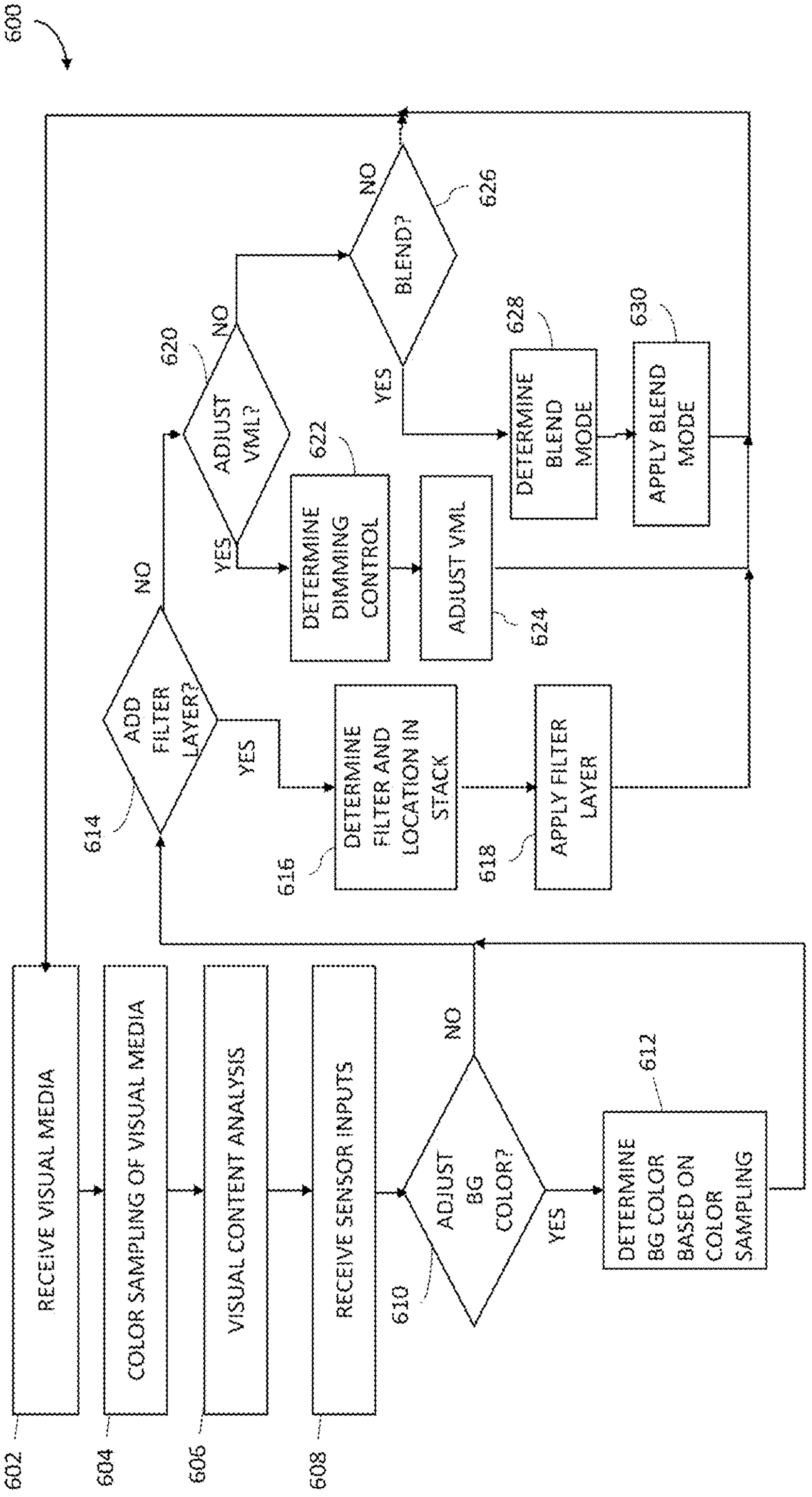
FIG. 6 illustrates a method for a decision engine in a display controller, according to some examples.

FIG. 6 illustrates a method 600 for a decision engine 170 in a display controller 104, according to some examples. The method can be implemented by the decision engine 170, and/or by the display controller 104. The decision engine 170 starts by receiving visual media, such as a video stream (at operation 602) and sampling the colors of the visual media (at 604) to identify a major color (using a method for sampling pixels in a frame or series of frames to identify a color and hue. Visual content analysis (at 606) identifies viewing criteria of the visual image for presentation. Sensor inputs (e.g., for ambient light condition, etc.) are received (at 606). The decision engine 170 determines if the background layer color is to be adjusted based on color sampling (at 610), and then color adjustment is made to the background layer (at 612). In some examples, the decision engine determines whether the opacity and/or brightness or shade of the background layer color is to be adjusted, for example based on sampling opacity and/or brightness and/or color values of the visual content. The decision engine 170 determines if one or more filters are to be added to the presentation layer stack (at 614), and if so, it determines the filter and location in the presentation layer stack (at 616). The filter is applied at 618. The decision engine 170 determines if an adjustment is to be made to the visual media layer (at 620). If so, it determines dimming control (at 622) corresponding to how much the visual media layer should be dimmed, and adjusts the visual media layer (at 624) accordingly. Possible adjustments to the media layer include dimming, increasing or decreasing opacity, and so forth. The decision engine 170 determines if layers should be blended (at 626), determines a blend mode (at 628), and/or applies it (at 630).

Figure 7:
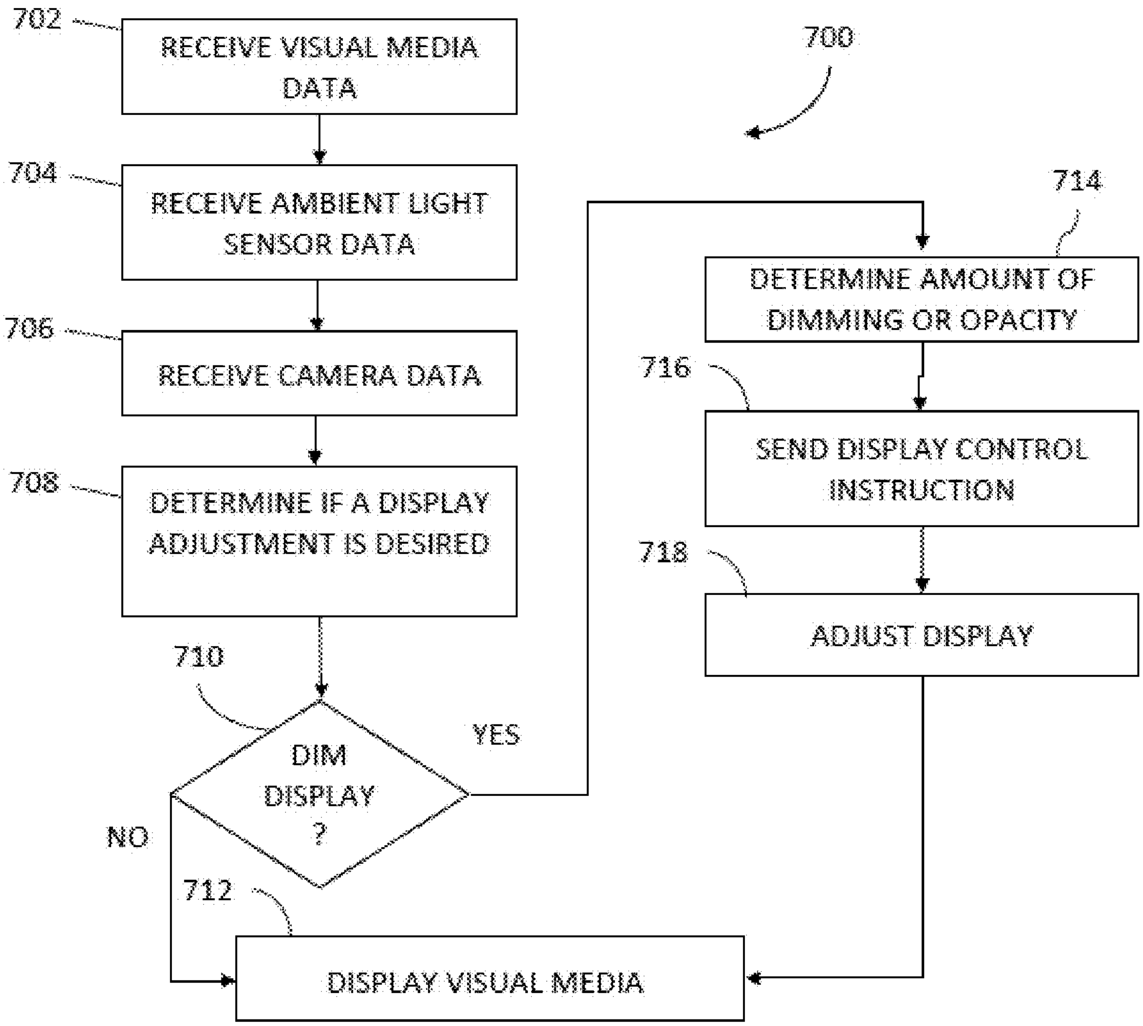
FIG. 7 illustrates a method for a decision engine in a display controller, according to some examples.

FIG. 7 illustrates a method 700 for a decision engine 170 in a display controller 104, according to some examples. The method can be implemented by the decision engine 170, and/or by the display controller 104.

The decision engine 170 can receive visual media data (at operation 702), ambient light sensor data (at 704), camera data (at 706), and/or determine if a display adjustment is desired (at 708). The adjustment to the visual media layer to dim the display is decided at 710. The amount of dimming or opacity determined at 714. Display instructions are sent to the display device (at 716) to adjust the display (at 718). Visual media is displayed (at 712), with the determined adjustments, or without adjustments.

Figure 8:
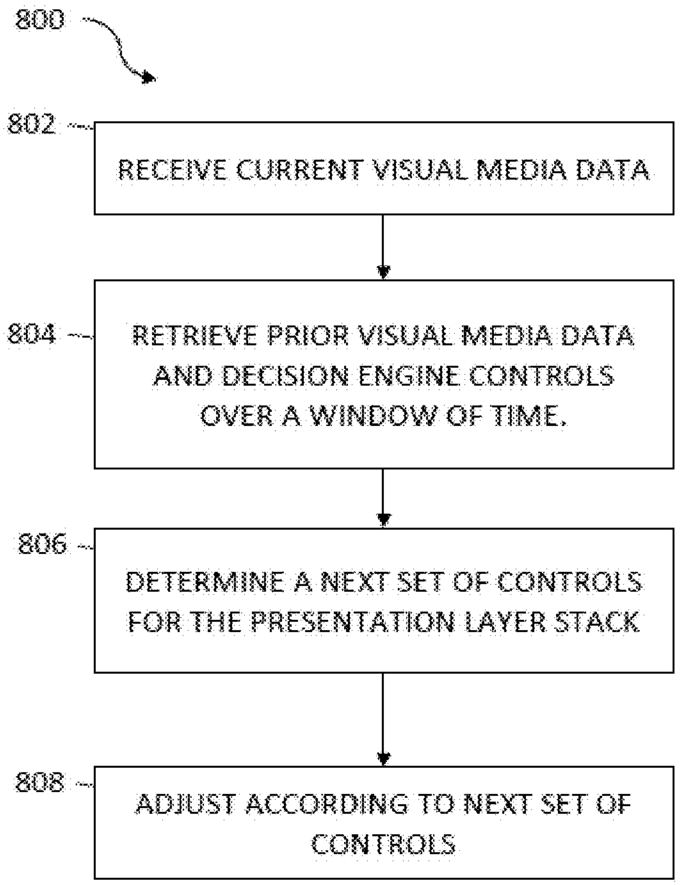
FIG. 8 illustrates a method for a decision engine in a display controller, according to some examples.

FIG. 8 for a decision engine 170 in a display controller 104, according to some examples. The method can be implemented by the decision engine 170, and/or by the display controller 104. The decision engine 170 receives current visual media data (at 802), and/or retrieves prior visual media data and/or the decision engine control decisions over a window of time (at 804). The decision engine 170 then determines a next set of controls for the presentation layer stack (at 806) and makes adjustments according to the next set of controls (at 808).

Figure 9:
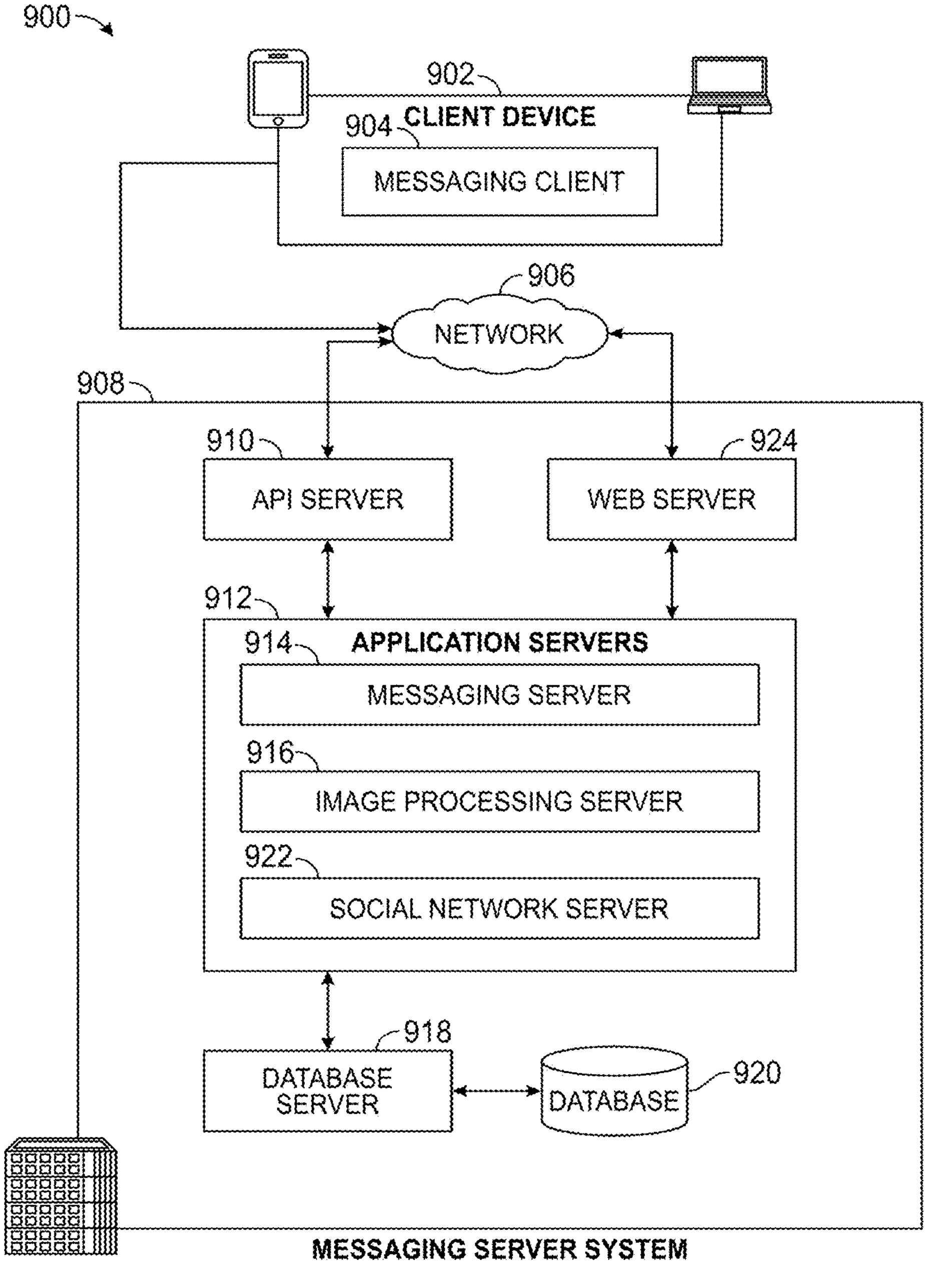
FIG. 9 is a diagrammatic representation of a networked environment in which the present disclosure can be deployed, according to some examples.

FIG. 9 is a diagrammatic representation of a networked environment in which the present disclosure can be deployed, according to some examples. For example, FIG. 9 illustrates a messaging system 900 for exchanging data (e.g., messages and associated content) over a network, within which device display system 100 can be implemented, according to some examples. The messaging system 900 includes multiple instances of a client device 902, each of which hosts applications, including a messaging client 904. Each messaging client 904 is communicatively coupled to other instances of the messaging client 904 on other client devices 902 and a messaging server system 908 via a network 906 (e.g., the Internet). The device display system 100 can be implemented and/or hosted at the level of client device(s) 902. Part or all of the functionality of the device display system 100 can be implemented or hosted at the level of the messaging server system 908 (e.g., see image processing server 916, etc.), and in other parts of the networked environment described herein.

A messaging client 904 can communicate and exchange data with another messaging client 904 and with the messaging server system 908 via network 906. The data exchanged between messaging client 904, and between a messaging client 904 and the messaging server system 908, includes functions (e.g., commands to invoke functions) as well as payload data (e.g., text, audio, video, or other multimedia data).

The messaging server system 908 provides server-side functionality via network 906 to a messaging client 904. While certain functions of the messaging system 900 are described herein as being performed by either a messaging client 904 or by the messaging server system 908, the location of certain functionality either within the messaging client 904 or the messaging server system 908 can be a design choice. For example, it can be technically preferable to initially deploy certain technology and functionality within the messaging server system 908 but to later migrate this technology and functionality to the messaging client 904 where a client device 902 has sufficient processing capacity.

The messaging server system 908 supports various services and operations provided to the messaging client 904. Such operations include transmitting data to, receiving data from, and processing data generated by the messaging client 904. This data may include message content, client device information, geolocation information, media augmentation and overlays, message content persistence conditions, social network information, and live event information, as examples. Data exchanges within the messaging system 900 are invoked and controlled through functions available via UIs of the messaging client 904.

Turning now specifically to the messaging server system 908, an Application Program Interface (API) server 910 is coupled to, and provides a programmatic interface to, application servers 912. The application servers 912 are communicatively coupled to a database server 918, which facilitates access to a database 920 that stores data associated with messages processed by the application servers 912. For example, database 920 stores audio content from voice chat messages associated with the respective sender identifications, with or without the associated text. For this description, a voice chat message includes an audio message (or a reference to it) and the associated text representation of the audio. The audio content from a voice chat message may persist until an instruction to delete the voice chat message is received at the messaging system.

Similarly, a web server 924 is coupled to the application servers 912 and provides web-based interfaces to the application servers 912. To this end, the web server 924 processes incoming network requests over the Hypertext Transfer Protocol (HTTP) and/or several other related protocols.

The Application Program Interface (API) server 910 receives and transmits message data (e.g., commands and message payloads) between the client device 902 and the application servers 912. Specifically, the Application Program Interface (API) server 910 provides a set of interfaces (e.g., routines and protocols) that can be called or queried by the messaging client 904 to invoke functionality of the application servers 912. The Application Program Interface (API) server 910 exposes various functions supported by the application servers 912, including account registration, login functionality, the sending of messages, via the application servers 912, from a particular messaging client 904 to another messaging client 904, the sending of media files (e.g., images or video) from a messaging client 904 to a messaging server 914, and for possible access by another messaging client 904, the settings of a collection of media data (e.g., story), the retrieval of a list of friends of a user of a client device 902, the retrieval of such collections, the retrieval of messages and content, the addition and deletion of entities (e.g., friends) to an entity graph (e.g., a social graph), the location of friends within a social graph, and opening an application event (e.g., relating to the messaging client 904).

The application servers 912 host many server applications and subsystems, including a messaging server 914, an image processing server 916, or a social network server 922, among others. The messaging server 914 implements message processing technologies and functions, particularly related to the aggregation and other processing of content (e.g., textual and multimedia content) included in messages received from multiple instances of the messaging client 904. The text and media content from multiple sources may be aggregated into collections of content (e.g., called stories or galleries). These collections are then made available to the messaging client 904. Other processor and memory intensive processing of data may also be performed server-side by the messaging server 914, in view of the hardware requirements for such processing.

The application servers 912 also include an image processing server 916 that is dedicated to performing various image processing operations, typically with respect to images or video (e.g., for example within the payload of a message sent from or received at the messaging server 914). The image processing server 916 can implement and/or host some of the functionality of the device display system 100.

The social network server 922 supports various social networking functions and services and makes these functions and services available to the messaging server 914. To this end, the social network server 922 maintains and accesses an entity graph within database 920. Examples of functions and services supported by the social network server 922 include the identification of other users of the messaging system 900 with which a particular user has relationships or is "following," and also the identification of other entities and interests of a particular user.

As described herein, a device display system having a perception controller acts to adjust the perceived brightness level of visual content as a function of the visual content. Adjustment may be made to individual layers of a presentation stack of layers, multiple layers, the stacking order, filtering layers and a combination thereof. In this way, visual content is prepared for publication to provide an enhanced user experience. For example, the device display system modifies the visual content to cause a perceived adjustment to the brightness of the displayed content. The device display system may modify the perceived brightness of visual content by adjusting an opacity of a visual media layer, adding and/or adjusting the color or shade of a background layer of the visual content, applying, or adjusting a filtered layer over the visual media layer, and/or a combination of thereof. The device display system may decrease the perceived brightness of visual content by decreasing the opacity of the visual media layer, thereby increasing the visibility of a dark colored background layer through the visual medial layer. As another example, the device display system may increase the perceived brightness of visual content by increasing the opacity of the visual media layer, thereby decreasing the visibility of a dark colored background layer through the visual medial layer.

The present inventions may be implemented in a mobile device or other computing device having a display. As used herein computer-readable storage medium refers to both machine-storage media and transmission media. The terms machine-readable medium, computer-readable medium and device-readable medium mean the same thing and may be used interchangeably in this disclosure. Machine storage medium refers to single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile or non-transitory memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium, device-storage medium, computer-storage medium mean the same thing and may be used interchangeably in this disclosure.

EXAMPLES

Example 1 is a method comprising: receiving visual content for display on a display device, the visual content comprising a plurality of layers comprising a background layer and visual media layer, the plurality of layers being arranged in a presentation stack of layers; evaluating the visual content to determine at least one display parameter; determining a desired brightness level for displaying the visual content on a display of the display device based on the at least one display parameter; determining adjustment of display parameters of the presentation stack of layers to achieve the desired brightness level for displaying the visual content; based on adjusting the display parameters of the presentation stack of layers, generating adjusted visual content; and causing presentation of the adjusted visual content on the display device.

In Example 2, the subject matter of Example 1 includes, wherein adjusting the display parameters comprises modifying a brightness level of the background layer.

In Example 3, the subject matter of Example 2 includes, wherein modifying the brightness level of the background layer comprises adjusting an opacity of the background layer to increase visibility of the adjusted visual content.

In Example 4, the subject matter of Examples 1-3 includes, wherein adjusting the display parameters comprises applying a filter layer to the presentation stack of layers.

In Example 5, the subject matter of Examples 2-4 includes, wherein adjusting the display parameters comprises reordering a set of layers of the presentation stack of layers.

In Example 6, the subject matter of Examples 1-5 includes, evaluating an ambient light score; and using the ambient light score in evaluating the visual content to determine the desired brightness level for displaying the visual content.

In Example 7, the subject matter of Examples 1-6 includes, wherein evaluating the visual content further comprises evaluating the visual content with respect to a prior visual content.

In Example 8, the subject matter of Example 7 includes, wherein evaluating the visual content further comprises evaluating the visual content with respect to a stream of visual content.

In Example 9, the subject matter of Examples 4-8 includes, wherein applying the filter layer to the presentation stack of layers comprises: selecting the filter layer based on an initial brightness level of the visual content and the desired brightness level for displaying the visual content.

In Example 10, the subject matter of Example 9 includes, wherein applying a filter layer to the presentation stack of layers further comprises updating an opacity of the filter layer.

In Example 11, the subject matter of Examples 1-10 includes, wherein adjusting the display parameters of the presentation stack of layers comprises: determining a configuration for the presentation stack of layers.

In Example 12, the subject matter of Examples 1-11 includes, determining the desired brightness level for displaying the visual content on the display of the display device based on brightness levels of at least one previously presented visual content.

In Example 13, the subject matter of Examples 11-12 includes, wherein determining the desired brightness level for displaying the visual content on the display of the display device is further based on an ambient light score determined based on sensor data describing a current environment of the display device.

Example 14 is at least one machine-readable medium including instructions that, when executed by processing circuitry, cause the processing circuitry to perform operations to implement any of Examples 1-13.

Example 15 is an apparatus comprising means to implement any of Examples 1-13.

Example 16 is a system to implement any of Examples 1-13.

Example 17 is a display device comprising: one or more computer processors; and one or more computer-readable mediums storing instructions that, when executed by the one or more computer processors, causes the display device to perform operations comprising: receiving visual content for display on a display device, the visual content comprising a plurality of layers comprising a background layer and visual media layer, the plurality of layers being arranged in a presentation stack of layers; evaluating the visual content to determine at least one display parameter; determining a desired brightness level for displaying the visual content on a display of the display device based on the at least one display parameter; determining adjustment of display parameters of the presentation stack of layers to achieve the desired brightness level for displaying the visual content; based on adjusting the display parameters of the presentation stack of layers, generating adjusted visual content; and causing presentation of the adjusted visual content on the display device.

In Example 18, the subject matter of Example 17 includes, a display controller comprising: a decision engine for determining the desired brightness level; a visual content module for analyzing the visual content to extract parameters and provide extracted parameters to the decision engine; and a background layer module enabled to receive instructions from the decision engine and apply the instructions to adjust a brightness of the background layer.

In Example 19, the subject matter of Example 18 includes, a sensor module enabled to receive sensor information from sensors and provide the sensor information to the decision engine.

In Example 20, the subject matter of Example 19 includes, wherein sensor information includes an ambient light score.

In Example 21, the subject matter of Examples 18-20 includes, a visual stream module enabled to evaluate the visual content with respect to a prior visual content and identify parameters of the prior visual content to provide to the decision engine.

In Example 22, the subject matter of Examples 17-21 includes, wherein adjusting display parameters of the presentation stack of layers comprises: determining an order of layers in the presentation stack of layers.

Example 23 is at least one non-transitory, machine-readable medium including instructions that, when executed by processing circuitry, cause the processing circuitry to perform operations to implement of any of Examples 17-22.

Example 24 is an apparatus comprising means to implement any of Examples 17-22.

Example 25 is a system to implement any of Examples 17-22.

Example 26 is a method to implement any of Examples 17-22.

Example 27 is a method comprising: accessing visual content for display on a display device, the visual content comprising a plurality of layers; determining a desired brightness level for displaying the visual content; evaluating the visual content to determine at least one display parameter; and in response to evaluating the desired brightness level in relation to the at least one display parameter: determining adjustment of display parameters of the plurality of layers to achieve the desired brightness level for displaying the visual content; based on adjusting the display parameters of the plurality of layers, generating adjusted visual content; and causing presentation of the adjusted visual content on the display device.

In Example 28, the subject matter of Example 27 includes, wherein the plurality of layers comprises a background layer and visual media layer.

In Example 29, the subject matter of Example 28 includes, wherein the adjustment of display parameters of the plurality of layers further comprises varying an opacity of the visual media layer.

In Example 30, the subject matter of Examples 28-29 includes, wherein the adjustment of display parameters of the plurality of layers further comprises adjusting a color of background layer based on color sampling of the visual media layer.

In Example 31, the subject matter of Examples 28-30 includes, wherein adjusting the display parameters comprises modifying an opacity level of the background layer.

In Example 32, the subject matter of Examples 27-31 includes, wherein the plurality of layers is arranged in a presentation stack of layers.

In Example 33, the subject matter of Example 32 includes, wherein adjusting the display parameters comprises reordering a set of layers of the presentation stack of layers.

In Example 34, the subject matter of Examples 32-33 includes, wherein adjusting the display parameters further comprises adding a filter layer to the presentation stack of layers.

In Example 35, the subject matter of Example 34 includes, wherein adding a filter layer to the presentation stack of layers further comprises selecting the filter layer based on an initial brightness level of the visual content, and the desired brightness level for displaying the visual content.

In Example 36, the subject matter of Example 35 includes updating an opacity of the filter layer.

Example 37 is at least one non-transitory, machine-readable medium including instructions that, when executed by processing circuitry, cause the processing circuitry to perform operations to implement of any of Examples 27-36.

Example 38 is an apparatus comprising means to implement any of Examples 27-36.

Example 39 is a system to implement any of Examples 27-36.

Example 40 is a method to implement any of Examples 27-36.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A method comprising:

accessing, by a computing device, visual content including a plurality of layers;

evaluating the visual content to determine at least one parameter associated with the visual content;

determining a desired brightness level for displaying the visual content;

determining adjustment of display parameters of the plurality of layers to achieve the desired brightness level for displaying adjusted visual content, the determining being based on the at least one parameter associated with the visual content;

adjusting the display parameters of the plurality of layers, the adjusting comprising modifying a first color of a first layer based on sampling a second color of a second layer; and causing presentation of the adjusted visual content on the computing device.

2. The method of claim 1, wherein the plurality of layers comprises a visual media layer and a background layer.

3. The method of claim 2, wherein the first layer corresponds to the background layer.

4. The method of claim 2, wherein adjusting the display parameters further comprises adjusting an opacity of the background layer to increase visibility of the adjusted visual content.

5. The method of claim 2, wherein adjusting the display parameters further comprises varying an opacity of the visual media layer.

6. The method of claim 2, wherein the second layer corresponds to the visual media layer.

7. The method of claim 2, further comprising applying a filter layer to the plurality of layers.

8. The method of claim 7, wherein applying the filter layer comprises selecting one of a set of blend modes, the set of blend modes including at least an overlay mode or a color burn mode.

9. The method of claim 7, wherein applying the filter layer to the plurality of layers comprises:

selecting the filter layer based on an initial brightness level of the visual content and the desired brightness level for displaying the visual content.

10. The method of claim 9, further comprising adjusting the filter layer based on sampling a color of the visual media layer.

11. The method of claim 1, further comprising:

evaluating an ambient light score; and using the ambient light score in evaluating the visual content to determine the desired brightness level for displaying the visual content.

12. The method of claim 1, wherein evaluating the visual content further comprises evaluating the visual content with respect to at least one of a prior visual content or with respect to a stream of visual content.

13. The method of claim 1, wherein adjusting the display parameters of the plurality of layers comprises determining a configuration for the plurality of layers, the plurality of layers being arranged in a presentation stack of layers.

14. A display device comprising:

one or more computer processors; and one or more computer-readable mediums storing instructions that, when executed by the one or more computer processors, causes the display device to perform operations comprising:

accessing visual content including a plurality of layers;

evaluating the visual content to determine at least one parameter associated with the visual content;

determining a desired brightness level for displaying the visual content;

determining adjustment of display parameters of the plurality of layers to achieve the desired brightness level for displaying adjusted visual content, the determining being based on the at least one parameter associated with the visual content;

adjusting the display parameters of the plurality of layers, the adjusting comprising modifying a first color of a first layer based on sampling a second color of a second layer; and causing presentation of the adjusted visual content.

15. The display device of claim 14, wherein the plurality of layers comprises a visual media layer and a background layer.

16. The display device of claim 15, wherein adjusting the display parameters further comprises adjusting an opacity of the background layer to increase visibility of the adjusted visual content.

17. The display device of claim 15, wherein adjusting the display parameters further comprises varying an opacity of the visual media layer.

18. The display device of claim 14, the operations further comprising:

evaluating an ambient light score; and using the ambient light score in evaluating the visual content to determine the desired brightness level for displaying the visual content.

19. The display device of claim 14, wherein evaluating the visual content further comprises evaluating the visual content with respect to at least one of a prior visual content or with respect to a stream of visual content.

20. A non-transitory computer-readable medium storing instructions that, when executed by one or more computer processors of a display device, causes the display device to perform operations comprising:

accessing visual content including a plurality of layers;

evaluating the visual content to determine at least one parameter associated with the visual content;

determining a desired brightness level for displaying the visual content;

determining adjustment of display parameters of the plurality of layers to achieve the desired brightness level for displaying adjusted visual content, the determining being based on the at least one parameter associated with the visual content;

adjusting the display parameters of the plurality of layers, the adjusting comprising modifying a first color of a first layer based on sampling a second color of a second layer; and causing presentation of the adjusted visual content on the display device.

* * * * *